(12) United States Patent
Ramesh et al.

(10) Patent No.: US 11,814,248 B2
(45) Date of Patent: Nov. 14, 2023

(54) METHODS, APPARATUSES, AND SYSTEMS FOR AUTOMATICALLY DETECTING OBJECTS WITHIN A CONVEYOR ZONE

(71) Applicant: INTELLIGRATED HEADQUARTERS, LLC, Mason, OH (US)

(72) Inventors: Senthil Ramesh, Tamil Nadu (IN); Kalirajan Chelliah, Bangalore (IN); Murugavel Swaminathan, Tamilnadu (IN)

(73) Assignee: Intelligrated Headquarters, LLC, Mason, OH (US)

( * ) Notice: Subject to any disclaimer, the term of this patent is extended or adjusted under 35 U.S.C. 154(b) by 164 days.

(21) Appl. No.: 17/374,609

(22) Filed: Jul. 13, 2021

(65) Prior Publication Data

US 2022/0267100 A1    Aug. 25, 2022

(30) Foreign Application Priority Data

Feb. 23, 2021    (IN) .............................. 202111007550

(51) Int. Cl.
*B65G 43/08*    (2006.01)
*B65G 43/02*    (2006.01)

(52) U.S. Cl.
CPC ............. *B65G 43/08* (2013.01); *B65G 43/02* (2013.01); *B65G 2203/0258* (2013.01); *B65G 2203/042* (2013.01)

(58) Field of Classification Search
CPC .................... B65G 43/08; B65G 43/02; B65G 2203/0258; B65G 2203/042
See application file for complete search history.

(56) References Cited

U.S. PATENT DOCUMENTS 5,547,034 A    8/1996  Wurz et al.
9,233,799 B1   1/2016  Mishra et al.
(Continued)

FOREIGN PATENT DOCUMENTS

CA    2863814 A1    8/2013
CN    102145810 A   8/2011
(Continued)

OTHER PUBLICATIONS

Qi, Jin-Zhi, It is a kind of wedge shape magnetic material adjust feeding-distribution device, 20181106, China, CN 108750600 A, ( for pertinent pages see office action) (Year: 2018).*
(Continued)

*Primary Examiner* — Gene O Crawford
*Assistant Examiner* — Lester Ill Rushin
(74) *Attorney, Agent, or Firm* — Alston & Bird LLP

(57) ABSTRACT

Method, apparatuses, and computer program products for dynamically detecting an item within a conveyor zone are disclosed herein. An example method may comprise: accessing a load condition data object, wherein the load condition data object is indicative of a force exerted on at least one conveyor zone, processing the load condition data object using a weight condition detection model to generate a weight condition indication associated with the at least one conveyor zone, and causing one or more prediction-based actions to be performed based at least in part on the weight condition indication.

20 Claims, 8 Drawing Sheets

(56) References Cited

U.S. PATENT DOCUMENTS

| | | | |
|---|---|---|---|
| 9,321,598 B2* | 4/2016 | Araki | B65G 43/08 |
| 10,949,635 B2* | 3/2021 | Edwards | G06K 7/1443 |
| 11,059,676 B2* | 7/2021 | Nitzberg | B65G 47/261 |
| 11,142,408 B2 | 10/2021 | Kleczewski | |
| 2017/0028562 A1 | 2/2017 | Yamazaki et al. | |
| 2018/0155133 A1 | 6/2018 | Andreas | |
| 2019/0155264 A1 | 5/2019 | Enssle et al. | |
| 2020/0324973 A1* | 10/2020 | Edwards | G06K 7/10861 |
| 2022/0402703 A1* | 12/2022 | Vanderhoef | B65G 37/005 |

FOREIGN PATENT DOCUMENTS

| | | |
|---|---|---|
| CN | 111093846 A | 5/2020 |
| EP | 0662605 A1 | 7/1995 |

OTHER PUBLICATIONS

Greyson, Tiffany, Lee, Conveyor Controller with Analytics System, Apr. 28, 2022, WIPO PCT, WO2022087592A1 (Year: 2022).*
EP3690578 (Year: 2020).*
IN Office Action dated Oct. 17, 2022 for IN Application No. 202111007550.

* cited by examiner

METHODS, APPARATUSES, AND SYSTEMS FOR AUTOMATICALLY DETECTING OBJECTS WITHIN A CONVEYOR ZONE

CROSS-REFERENCES TO RELATED APPLICATION(S)

The present application claims priority to Indian Non-Provisional Patent Application No. 202111007550 (filed Feb. 23, 2021), which is incorporated herein by reference in its entirety.

BACKGROUND

Optical methods may be utilized for tracking items on conveyors, such as accumulation conveyors, in various environments (e.g., material handling enterprise (MHE), warehouses, and/or the like). Such optical methods are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for automatically performing sorting operations.

In accordance with various examples of the present disclosure, a computer-implemented method is provided. The computer-implemented method may comprise accessing a load condition data object, wherein the load condition data object is indicative of the force exerted on at least one conveyor zone; processing the load condition data object using a weight condition detection model to generate a weight condition indication associated with the at least one conveyor zone; and causing one or more prediction-based actions to be performed on the at least one conveyor zone based at least in part on the weight condition indication.

In some examples, the computer-implemented method may further comprise accessing a conveyor status data object configured to describe the current status of the at least one conveyor zone, and wherein causing the one or more prediction-based actions comprises processing at least the weight condition indication and the conveyor status data object to generate a conveyor status data object for the at least one conveyor zone and transmitting the conveyor status data object for the at least one conveyor zone to a conveyor control unit, wherein the status data object is configured to cause the conveyor control unit to update the status of the at least one conveyor zone.

In some examples, the one or more prediction-based actions to be performed comprises maintaining current conditions in an instance in which the weight condition indication indicates the at least one conveyor zone is not overloaded.

In some examples, causing the one or more prediction-based actions comprises processing the weight condition indication for the at least one conveyor zone to determine a conveyor status data object for one or more other conveyor zones and transmitting the conveyor status data object for the one or more other conveyor zones to a conveyor control unit, wherein the conveyor status data object is configured to cause the control unit to update the status of the one or more other conveyor zones.

In some examples, the control unit is configured to determine at least an upstream or downstream conveyor zone for the at least one conveyor zone.

In some examples, the computer-implemented method may further comprise generating a zone status indication data object associated with the at least one conveyor zone based at least in part on the weight condition indication.

In some examples, the computer-implemented method may further comprise generating a notification data object for the at least one conveyor zone and transmitting the notification data object for the at least one conveyor zone to a conveyor control unit, wherein the notification data is configured to trigger at least an alarm associated with the at least one conveyor zone based at least in part on the weight condition indication.

In some examples, the computer-implemented method may further comprise generating an expected load condition data object for at least one downstream conveyor zone based at least in part on the load condition data object for the at least one conveyor zone, wherein the expected load condition data object is configured to describe the force to be exerted on the at least one downstream conveyor zone; accessing a load condition data object configured to describe the force exerted on the at least one downstream conveyor zone; and determining whether the expected load condition data objected matches the load condition data object within a predefined tolerance for the at least one downstream conveyor zone.

In accordance with various examples of the present disclosure, an apparatus is provided. The apparatus may comprise one or more sensor elements configured to electronically transmit a load condition data object, wherein the load condition data object is indicative of the force exerted on at least one conveyor zone; at least one processing component configured to: access a load condition data object; process the load condition data object using a weight condition detection model to generate a weight condition indication associated with the at least one conveyor zone; and cause one or more prediction-based actions to be performed on the at least one conveyor zone based at least in part on the weight condition indication.

In accordance with various examples of the present disclosure, a computer program product is provided. The computer-program product be configured, upon execution, to access a load condition data object, wherein the load condition data object is indicative of the force exerted on at least one conveyor zone; process the load condition data object using a weight condition detection model to generate a weight condition indication associated with the at least one conveyor zone; and cause one or more prediction-based actions to be performed on the at least one conveyor zone based at least in part on the weight condition indication.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise.

Embodiments incorporating teachings of the present disclosure are shown and described with respect to the figures presented herein, in which.

DETAILED DESCRIPTION OF THE INVENTION

Figure 1:
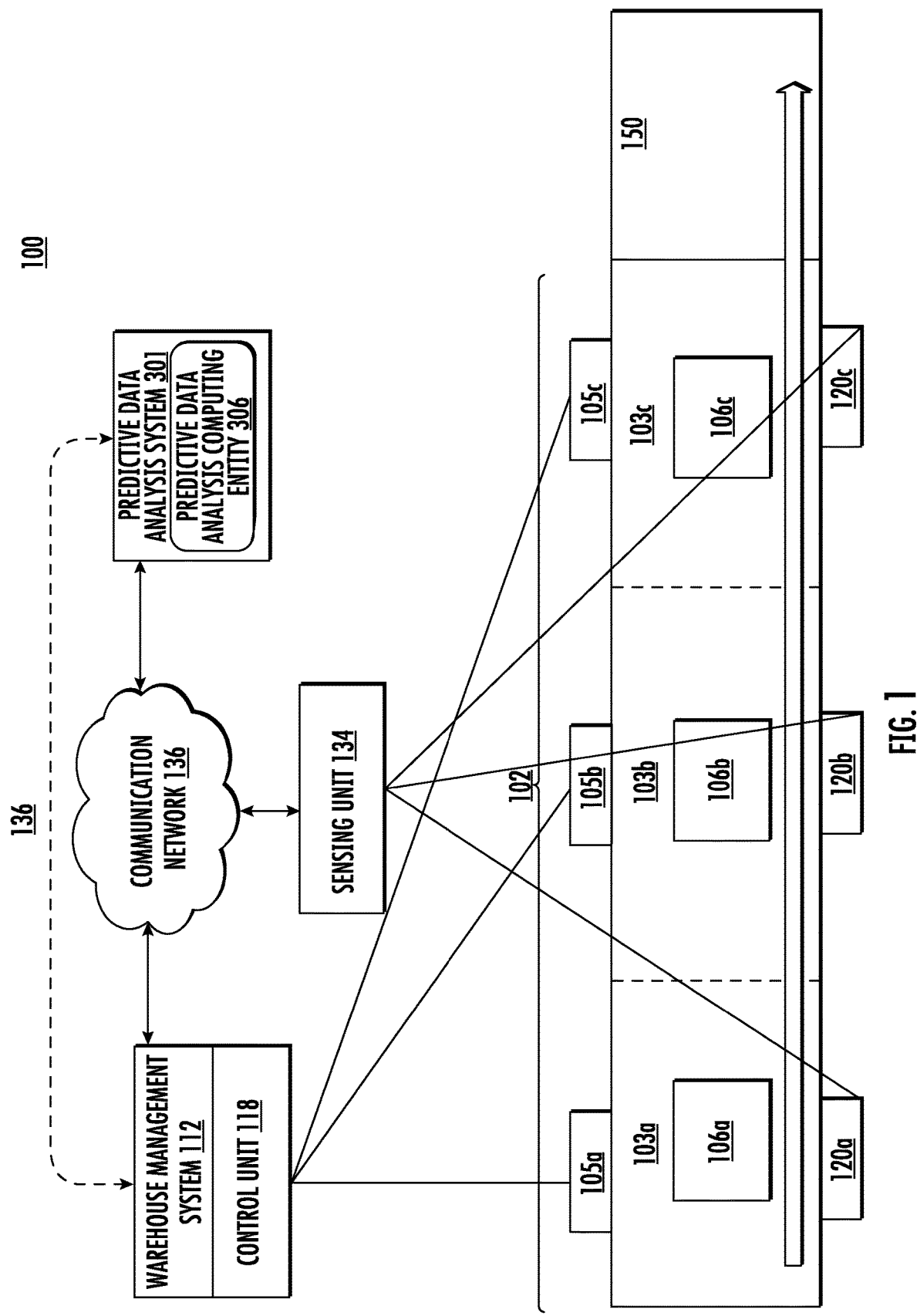
FIG. 1 illustrates a schematic view of a material handling system in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure refer to two or more electrical elements (for example, but not limited to, a computational platform, predictive data analysis system, sensing unit, warehouse management system, and control unit) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

The various embodiments are described herein using the term "predictive data analysis system." The term "predictive data analysis system" can be used herein to refer to any computing device or a distributed network of computing device capable of functioning as a server, such as a master exchange server, web server, mail server, document server, or any other type of server. A computing platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein. In some example embodiments, the computing platform may correspond to any of, an industrial computer, a cloud computing-based platform, an external computer, a standalone computing device, and/or the like.

The term "weight condition detection model" may refer to an electronically-stored data construct that is configured to describe parameters, hyper-parameters, and/or stored operations of a machine learning model that is configured to process a load condition data object in order to generate a weight condition indication. In some embodiments, the load condition data object may be indicative of the force exerted on a conveyor zone. In some embodiments, the weight condition detection model may be a classification machine learning model. For example, a weight condition detection model may be trained using electronic data to determine whether a conveyor zone is subjected to an overweight object. In some embodiments, the parameters/hyper-parameters of a weight condition detection model may be represented as binary values in a one-dimensional array.

The term "control unit" used hereinafter the description can correspond to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, the processing unit 116 can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. In some examples, the processing unit 116 can also exploit Nano-scale architectures such as, but not limited to, molecular and quantum-dot based transistors, switches and gates, in order to optimize space usage or enhance performance of user equipment.

In various applications, such as material handling enterprise (MHE) applications, items (e.g., parcels, packages, boxes and/or the like) may be conveyed in bulk from one location to another. In some examples, these items may be conveyed to a particular location. By way of example, a plurality of items may be conveyed from a first location to a second location, at where they may be accumulated with other items or may be discharged onto take-away conveyor.

In some examples, an accumulation conveyor may be used. Accumulation conveyors have the ability to turn on or shut off individual conveyor zones at will, thus allowing items to stop and collect. Accumulation conveyors may be used to allow an accumulation of the items into areas such as mergers, sorters, or palletizers.

When conveying the items from a first location to a second location, it may be beneficial to control the number of instances two or more items touch, e.g. minimum pressure accumulation, or entirely prevent the items from touching, e.g. zero pressure accumulation, thereby potentially preventing damage. In some examples, by preventing or minimizing touching or contact, the conveyor system may run efficiently and effectively and/or damage to the items may be reduced or eliminated. Typically, optical methods, such as photo-eye sensors, have been used to identify items within individual conveyor zones and said information is used to correspondingly start or stop the conveyor zones, such as conveyor zones in an accumulation conveyor. However, in some examples, these optical sensors may experience relatively low life spans, leading to frequent maintenance and upkeep to ensure the conveyor system is working properly. Additionally, optical sensors may be affected, in some examples, by external lighting or may be unable to recognize certain items due to their color, effectively rendering these optical sensors blind.

Furthermore, optical sensors are not directly capable of measuring item weight and therefore have no way to determine if a conveyor zone is experiencing overloading. Conveyor zones that experience overloading due to conveying heavy, overweight items are subject to a variety of mechanical and other issues. For example, conveyor zones subject to overloading may experience increased running resistance that requires increasing the power of their associated motor, thereby potentially overloading the motor. Aside from the financial burden of running an overloaded motor, the motor itself may overheat and result in complete motor failure. Additionally, other issues such as conveyor belt mis-tracking, belt slipping, belt damage and seized rollers may all result from overloading conveyor zones.

The present disclosure, in some examples, provides a method for dynamically detecting an item weight on a conveyor zone using one or more load sensors and taking one or more predictive actions based on the item's weight. For example, the method may be configured to determine if the item on the conveyor zone is overweight and causing the conveyor zone to be overloaded. Additionally, if the item is determined to be overweight, the method may cause one or more predictive actions, thereby reducing the likelihood that the overweight item will collide with items in other conveyor zones. As such, the present disclosure provides a load-based method for identifying items and their corresponding weight on a conveyor zone thus negating the need to rely on optical sensors and additionally allowing for identification of overweight items.

FIG. 1 schematically depicts a material handling system 100 comprising an accumulator conveyor 102 that takes the form of a belt conveyor, roller conveyor and/or the like. The accumulator conveyor 102 comprises a plurality of conveyor zones, including conveyor zone 103b, upstream conveyor zone 103a, and downstream conveyor zone 103c, configured for accumulation of items, in accordance with some example embodiments described herein. The accumulation conveyor 102 may comprise a plurality of individual controllable conveyor zones including conveyor zone 103b, upstream conveyor zone 103a, and downstream conveyor zone 103c. Although in the embodiment depicted in FIG. 1 shows three zones, the present invention is not limited to three zones. In some embodiments, the upstream conveyor zone 103a may comprise one or more conveyor zones upstream from conveyor zone 103b. In some embodiments, the downstream conveyor zone 103c may comprise one or more conveyor zones downstream from conveyor zone 103b. As will be appreciated, in some examples, the present invention provides for efficient accumulation of packages using a dynamic weight-based item detection system.

According to said example embodiments, the material handling system 100 can comprise a predictive data analysis system 301 that can comprise a predictive data analysis computing entity 306. Additionally, and/or alternatively, in some examples, a control unit 118 may also comprise the predictive data analysis computing entity 306. In accordance with said example embodiments, the predictive data analysis computing entity 306, can be communicatively coupled, via a communication network 136 to a respective component of the material handling system 100 (for example, but not limited to the control unit 118, the warehouse management system 112, the sensing unit 134, and/or the like) to perform various operations for example, but not limited to, generating a weight condition indication for conveyor zone 103b and causing one or more prediction-based actions based on the generated weight condition indication. Such prediction-based actions may include, but are not limited to, stopping or starting individual conveyor zone 103b, stopping or starting upstream conveyor zone 103a and/or downstream conveyor zone 103c, or the like. In this regard, the one or more components referred herein, may comprise a communications circuitry that may be configured to receive and/or transmit data from/to a network and/or any other device, circuitry, or module in communication over the communication network 136.

The communications circuitry referred herein, may be any means such as a device or circuitry embodied in either hardware or a combination of hardware and software associated with the respective component of the material handling system 100. In some examples, the communications circuitry may comprise a network interface for enabling communications with a wired or wireless communication network. For example, the communications circuitry may comprise one or more network interface cards, antennae, buses, switches, routers, modems, and supporting hardware and/or software, or any other device suitable for enabling communications via the communication network 136. Additionally, or alternatively, the communications circuitry may comprise the circuitry for interacting with the antenna(s) to cause transmission of signals via the antenna(s) or to handle receipt of signals received via the antenna(s). These signals may be transmitted by any of the components of the material handling system 100 and/or the control unit 118 over the communication network 136, using a number of wireless personal area network (PAN) technologies, such as, but not limited to, Bluetooth® v1.0 through v3.0, Bluetooth Low Energy (BLE), infrared wireless (e.g., IrDA), ultra-wideband (UWB), induction wireless transmission, and/or the like or via a wired communication technology, such as a data field bus, cables etc.

According to said example embodiments, the material handling system 100 comprises control unit 118. In accordance with said example embodiments, a control unit 118, can be communicatively coupled, via a communication network 136 to a respective component of the material handling system 100 (for example, but not limited to the accumulator conveyor 102, zone interface modules 105a, 105b, and 105c, the predictive data analysis system 301, predictive data analysis computing entity 306, the sensing unit 134, warehouse management system 112, and/or the like) to perform various operations for example, but not limited to, stopping or starting individual conveyor zone 103b, stopping or starting upstream conveyor zone 103a and/or downstream conveyor zone 103c, or the like.

According to some example embodiments, the control unit 118 may operate the conveyor zones 103a, 103b, and 103c of the accumulator conveyor 102 at variable speeds, may cause acceleration or de-acceleration of a zone, and/or may turn off the conveyor zone based at least in part on one or more prediction-based actions received from the predictive data analysis system 301 and/or data received from other sources. Further, the control unit 118 may be in communication with zone interface modules 105a, 105b, and 105c configured to selectively actuate driving belts and/or chains that cause rotation of one or more of the plurality of rollers. In this regard, control unit 118 may be configured to selectively drive each conveyor zone in any suitable manner through communication with a respective zone interface module 105a, 105b, 105c. Each conveyor zone, including upstream conveyor zone 103a, conveyor zone 103b, and downstream conveyor zone 103c may comprise a zone interface module 105a, 105b, and 105c, respectively, which may be configured to control pneumatic actuators of their associated conveyor zone and may be in communication with the control unit 118. In some embodiments, each conveyor zone comprises a plurality of conveyor rollers, which may be selectively driven by urging an underlying drive belt against the conveyor rollers using pneumatic actuators. The zone interface modules 105a, 105b, and 105c may be daisy chained together. Other drive arrangements include motorized drive pulleys, with zone interface modules 105a, 105b, and 105c configured appropriately therefor.

Control unit 118 may also be configured to control the direction of travel of each conveyor zone using zone interface modules 105a, 105b, and 105c, through the use of DIP switches. For example, control unit 118 may be in communication with zone interface modules 105a, 105b, and 105c such that items on the conveyor zones, such as item 106a, flow from upstream conveyor zone 103a to conveyor zone 103b and from conveyor zone 103b to downstream conveyor zone 103c. In some embodiments, the accumulator conveyor 102 may ultimately flow to a take-away conveyor 150 or other conveyor system. Zone interface modules 105a, 105b, and 105c may also be configured to use discrete I/O to allow control of the movement of items on the accumulation conveyor, allow external systems to monitor the fill state of the conveyor, and allow external systems to monitor fault conditions.

Illustratively, the material handling system 100 may also comprise a sensing unit 134 comprising sensors such as sensors 120a, 120b, and 120c. Each sensor 120a, 120b, and 120c may be associated with an individual conveyor zone, including upstream conveyor zone 103a, conveyor zone 103b, and downstream conveyor zone 103c. In the embodiments depicted, the sensors 120a, 120b, and 120c are load cells configured to measure the force an item exerts on the respective conveyor zone 103a, 103b, and 103c. For example, the sensors 120a, 120b, and 120c may be configured to measure tension, compression, pressure, torque, etc. According to said example embodiments, the sensing unit 134 may additionally comprise a controller that may be configured to collect sensory data from the sensors 120b and provide the sensor data to the control unit 118 and/or predictive data analysis system 301.

Figure 2:
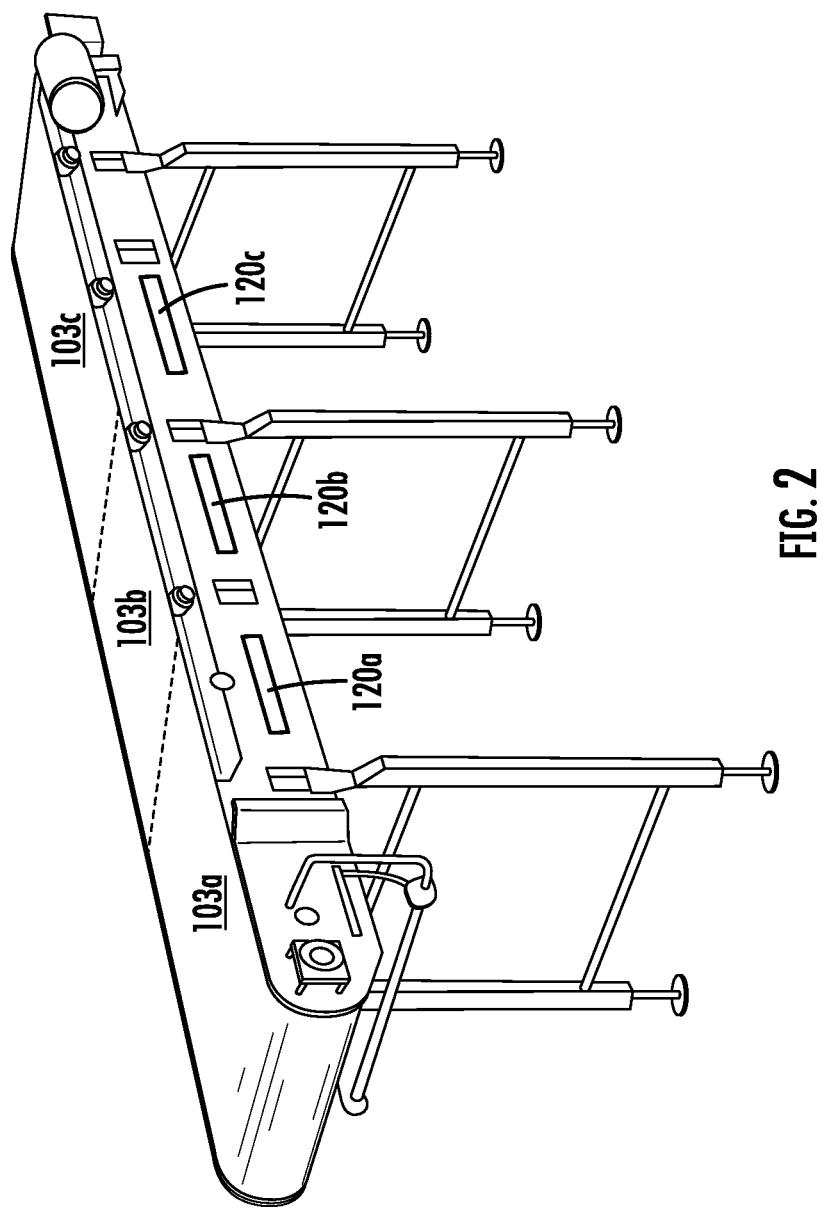
FIG. 2 illustrates an example apparatus in accordance with various embodiments of the present disclosure.

FIG. 2 show an accumulator conveyor 102 with conveyor zones 103a, 103b, and 103c and their associated sensors 120a, 120b, and 120c. In some embodiments, the sensors 120a, 120b, and 120c are load cells that are positioned beneath the conveyor belt and/or rollers. In this way, the sensors 120a, 120b, and 120c are able to determine the load experienced by the corresponding conveyor zone 103a, 103b, and 103c, and by extension, the weight of the item located within the respective conveyor zone.

In some embodiments, the weight from the plurality of rollers or belt associated with the conveyor zone 103b may exert a force on the corresponding sensor 120b, even when the conveyor zone is otherwise empty. This may be due to the laden weight from the force exerted by the plurality of rollers and/or belt, which may vary between individual conveyor zones. To compensate for this load and in order to accurately measure the load associated with a particular item, such as item 106a, 106b, or 106c, this associated laden weight may be stored in memory, such as memory of predictive data analysis system 301, and may be subtracted from the gross weight measured when the conveyor zone receives item 106a, 106b, or 106c. In this way, the predictive data analysis system 301 correctly measures the load caused from the corresponding item such that the true weight of the item may be determined. In some embodiments, the laden weight of conveyor zones may be periodically measured and updated such that the determined weight of the item is accurate.

Example embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Figure 3:
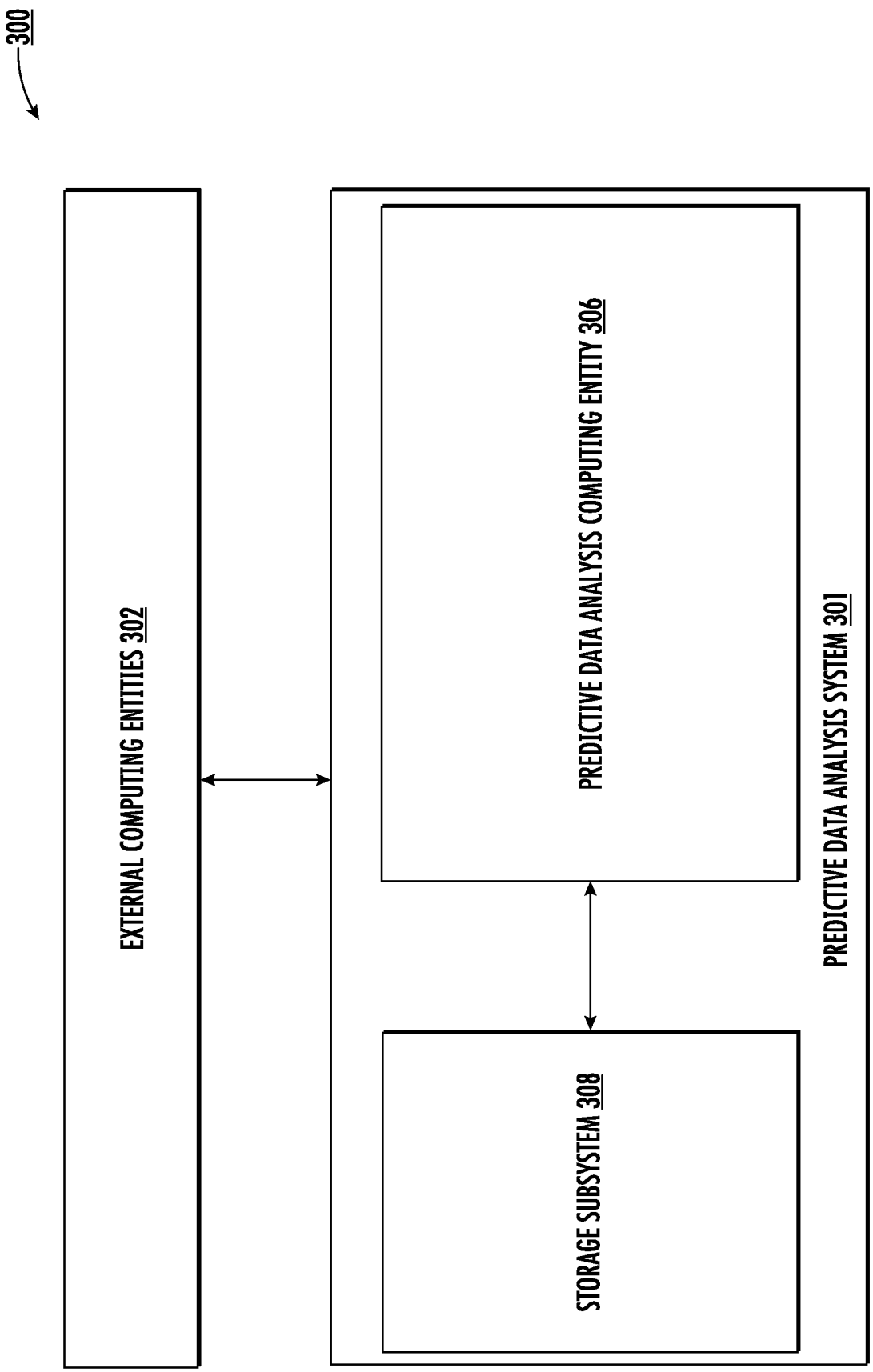
FIG. 3 provides an exemplary overview of processor component in electronic communication with various other components of an example apparatus in accordance with various embodiments of the present disclosure FIG. 4 provides an example predictive data analysis computing entity in accordance with some embodiments discussed herein.

FIG. 3 is a schematic diagram of an example system architecture 300 for performing predictive data analysis steps/operations and generating corresponding electronic data for the control unit 118, warehouse management system 112, or another external computing entity. The system architecture 300 includes a predictive data analysis system 301 comprising a predictive data analysis computing entity 306 configured to generate predictive outputs that lead to performing one or more prediction-based actions. The predictive data analysis system 301 may communicate with one or more external computing entities 302, such as warehouse management system 112, control unit 118, sensing unit 134, or the like using one or more communication networks, such as communication network 136. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction that may be generated by using the system architecture 300 is to a generate a weight condition indication for a conveyor zone 103b based on a load condition data object indicative of the force exerted on the conveyor zone 103b by item 106b and cause one or more prediction-based actions to be performed based on the weight condition indication.

The system architecture 300 includes a storage subsystem 308 configured to store at least a portion of the data utilized by the predictive data analysis system 301. The predictive data analysis computing entity 306 may be in communication with one or more external computing entities 302. The predictive data analysis computing entity 306 may be configured to receive requests and/or data from external computing entities 302, process the requests and/or data to generate predictive outputs (e.g., predictive data analysis data objects), and provide the predictive outputs to the external computing entities 302. The external computing entity 302 (e.g., sensing unit 134) may periodically update/provide raw input data (e.g., data objects describing primary events and/or secondary events) to the predictive data analysis system 301. The external computing entities 302 may further generate user interface data (e.g., one or more data objects) corresponding to the predictive outputs and may provide (e.g., transmit, send and/or the like) the user interface data corresponding with the predictive outputs for presentation to user computing entities operated by end-users.

The storage subsystem 308 may be configured to store at least a portion of the data utilized by the predictive data analysis computing entity 306 to perform predictive data analysis steps/operations and tasks. The storage subsystem 308 may be configured to store at least a portion of operational data and/or operational configuration data including operational instructions and parameters utilized by the predictive data analysis computing entity 306 to perform predictive data analysis steps/operations in response to requests. The storage subsystem 308 may include one or more storage units, such as multiple distributed storage units that are connected through a computer network. Each storage unit in the storage subsystem 308 may store at least one of one or more data assets and/or one or more data about the computed properties of one or more data assets. Moreover, each storage unit in the storage subsystem 308 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Figure 4:
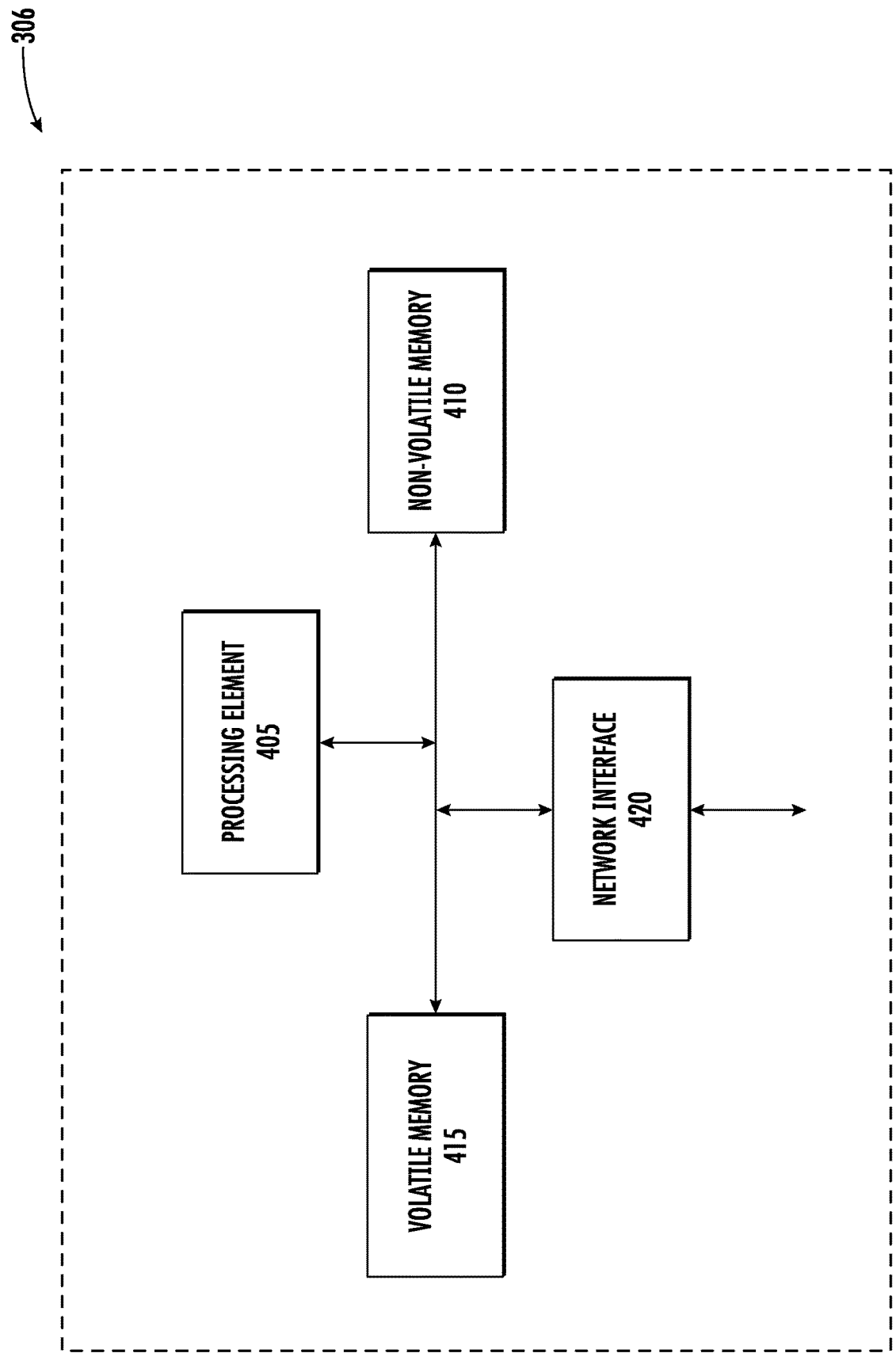

FIG. 4 provides a schematic of a predictive data analysis computing entity 306 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 306 may also include a network interface 420 for communicating with various computing entities, such as by communicating data, content, information, and/or similar terms used herein interchangeably that can be transmitted, received, accessed, operated on, processed, displayed, stored, and/or the like.

As shown in FIG. 4, in one embodiment, the predictive data analysis computing entity 306 may include or be in communication with a processing element 405 (also referred to as processors, processing circuitry, and/or similar terms used herein interchangeably) that communicate with other elements within the predictive data analysis computing entity 306 via a bus, for example. As will be understood, the processing element 405 may be embodied in a number of different ways.

For example, the processing element 405 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present invention when configured accordingly.

In one embodiment, the predictive data analysis computing entity 306 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 410, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 306 may further include or be in communication with volatile media (also referred to as volatile storage, memory, memory storage, memory circuitry and/or similar terms used herein interchangeably). In one embodiment, the volatile storage or memory may also include at least one volatile memory 415, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 405. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 306 with the assistance of the processing element 405 and operating system.

As indicated, in one embodiment, the predictive data analysis computing entity 306 may also include a network interface 420 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 306 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 306 may include or be in communication with one or more input elements, such as a keyboard input, a mouse input, a touch screen/display input, motion input, movement input, audio input, pointing device input, joystick input, keypad input, and/or the like. The predictive data analysis computing entity 306 may also include or be in communication with one or more output elements (not shown), such as audio output, video output, screen/display output, motion output, movement output, and/or the like.

Figure 5:
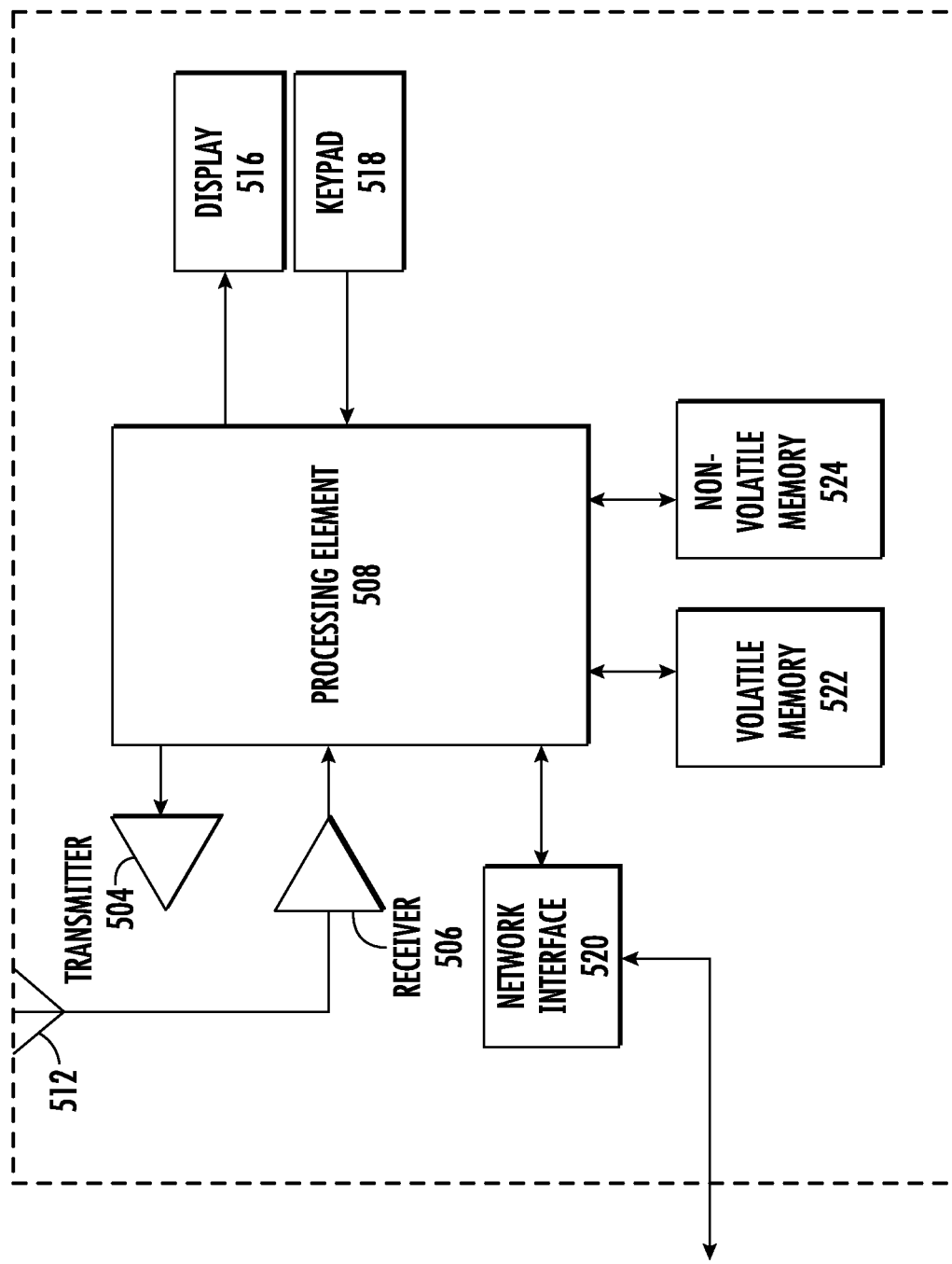
FIG. 5 provides an example external computing entity in accordance with some embodiments discussed herein.

FIG. 5 provides an illustrative schematic representative of an external computing entity 302 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 302 can be operated by various parties. As shown in FIG. 5, the external computing entity 302 can include an antenna 512, a transmitter 504 (e.g., radio), a receiver 506 (e.g., radio), and a processing element 508 (e.g., CPLDs, microprocessors, multi-core processors, coprocessing entities, ASIPs, microcontrollers, and/or controllers) that provides signals to and receives signals from the transmitter 504 and receiver 506, correspondingly.

The signals provided to and received from the transmitter 504 and the receiver 506, correspondingly, may include signaling information/data in accordance with air interface standards of applicable wireless systems. In this regard, the external computing entity 302 may be capable of operating with one or more air interface standards, communication protocols, modulation types, and access types. More particularly, the external computing entity 302 may operate in accordance with any of a number of wireless communication standards and protocols, such as those described above with regard to the predictive data analysis computing entity 306. In a particular embodiment, the external computing entity 302 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 302 may operate in accordance with multiple wired communication standards and protocols, such as those described above with regard to the predictive data analysis computing entity 306 via a network interface 520. The external computing entity 302 can also download changes, add-ons, and updates, for instance, to its firmware, software (e.g., including executable instructions, applications, program modules), and operating system.

The external computing entity 302 may also comprise a user interface (that can include a display 516 coupled to a processing element 508) and/or a user input interface (coupled to a processing element 508). For example, the user interface may be a user application, browser, user interface, and/or similar words used herein interchangeably executing on and/or accessible via the external computing entity 302 to interact with and/or cause display of information/data from the predictive data analysis computing entity 306, as described herein. The user input interface can comprise any of a number of devices or interfaces allowing the external computing entity 302 to receive data, such as a keypad 518 (hard or soft), a touch display, voice/speech or motion interfaces, or other input device. In embodiments including a keypad 518, the keypad 518 can include (or cause display of) the conventional numeric (0-9) and related keys (#, *), and other keys used for operating the external computing entity 302 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 302 can also include volatile storage or memory 522 and/or non-volatile storage or memory 524, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 302. As indicated, this may include a user application that is resident on the entity or accessible through a browser or other user interface for communicating with the predictive data analysis computing entity 306 and/or various other computing entities.

In another embodiment, the external computing entity 302 may include one or more components or functionality that are the same or similar to those of the predictive data analysis computing entity 306, as described in greater detail above. As will be recognized, these frameworks and descriptions are provided for exemplary purposes only and are not limiting to the various embodiments.

To address the technical challenges associated with dynamically detecting an item on a conveyor zone, such as conveyor zone 103b, various embodiments of the present invention describe a weight condition detection model configured to generate a weight condition indication for the associated conveyor zone based on an accessed load condition data object associated with the individual conveyor zone. The generation of a weight condition indication for individual conveyor zones is important, as threshold load conditions may vary between individual conveyor zones, based on a number of factors, such as the position of the conveyor zone within the accumulator conveyor, the standard operating conditions of the conveyor zone, the hardware for the specific conveyor zone, and the like. Because the weight condition detection model generates a weight condition indication for each conveyor zone, the weight condition detection model is able to better determine when a conveyor zone is experiencing overloading and take appropriate action in real-time or near real-time.

Figure 6:
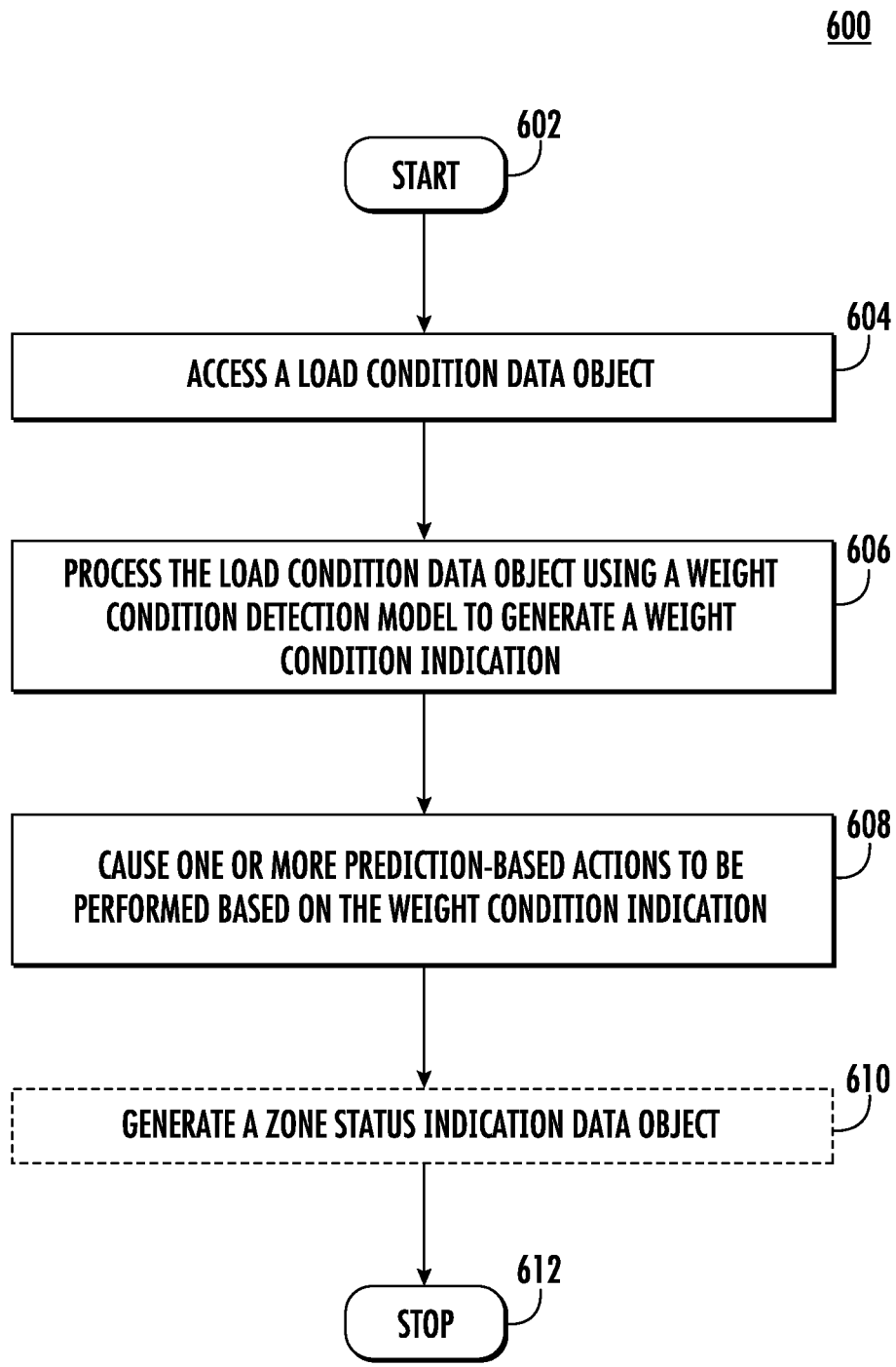
FIG. 6 is a flowchart diagram representing a method for causing one or more prediction-based actions, in accordance with various embodiments of the present disclosure.

FIG. 6 is a flowchart diagram of an example process 600 for causing on or more prediction-based actions to be performed based on a weight condition indication for a conveyor zone 103b. Via the various steps/operations of the process 600, the predictive data analysis computing entity 306 can accurately and dynamically generate a weight condition indication associated with a conveyor zone 103b and cause one or more prediction-based actions to be performed based on said weight condition indication.

The process 600 begins at step/operation 602. At step/operation 604, the predictive data analysis computing entity 306 accesses a load condition data object associated with conveyor zone 103b. In some embodiments, the load condition data object may be stored in the memory of the predictive data analysis system 301 at storage subsystem 308. Alternatively, a load condition data object may be stored in a memory associated with warehouse management system 112, control unit 118, or sensing unit 134. Regardless of where it is stored, the load condition data object may be accessed by the predictive data analysis computing entity 106b in real-time or near real-time such that the load condition data object is indicative of the force currently exerted on a conveyor zone 103b.

In some embodiments, the accessed load condition data object may be indicative of the force exerted on a conveyor zone 103b. In some embodiments, the sensor 105b associated with conveyor zone 103b may measure the force on the conveyor zone 103b and communicate the information to sensing unit 134. Sensing unit 134 may then be configured, via its associated controller, to transmit the load condition data object to predictive data analysis system 301, such that the load condition data object may be stored at storage subsystem 308. The load condition data object may also comprise identifying information such that the corresponding conveyor zone 103b is able to be identified and differentiated from other conveyor zones, such as upstream conveyor zone 103a and downstream conveyor zone 103c.

At step/operation 606, the predictive data analysis computing entity 306 processes the load condition data object using a weight condition detection model in order to generate a weight condition indication. A weight condition detection model may describe a machine learning model configured to process a load condition data object associated with conveyor zone 103b to generate a weight condition indication. In some embodiments, the weight condition detection model may be trained using observed load condition data to determine a threshold load condition specific to conveyor zone 103b. The weight condition detection model may use the specific threshold load condition for conveyor zone 103b when processing the load condition data object associated with conveyor zone 103b to generate a weight condition indication. In some embodiments, the weight condition detection model may be configured to determine a threshold load condition for individual conveyor zones, where any load condition above the load condition threshold is indicative of an overloaded conveyor zone due to an overweight item. This threshold load condition may be determined based on training data used to train the weight condition detection model and is specific to the individual conveyor zone. In some embodiments, the weight condition detection model is a classification model configured to determine if the conveyor zone is overloaded.

The weight condition detection model may classify a conveyor zone 103b as overloaded based at least in part on the load condition data object associated with conveyor zone 103b indicative of the force exerted on conveyor zone 103b by item 106b using the associated threshold load condition associated with conveyor zone 103b. Additionally and by extension, the weight condition detection model provides an classification of the weight of the item 106b, such as overweight or not overweight. For example, if item 106b is currently within conveyor zone 103b, it will cause an associated load condition data object indicative of a force exerted on the conveyor zone 103b due to item 106b, and by extension, an indication of the weight of the item 106b. If the load condition data object is greater than the threshold load condition, the weight condition detection model may classify conveyor zone 103b as overloaded and by extension, item 106b as overweight. By way of continuing example, if the conveyor section 103b is classified as overloaded, the weight condition indication may be 1. If the conveyor section 103b is classified as not overloaded, the weight condition indication may be 0.

At step/operation 608, the predictive data analysis computing entity 306 causes one or more prediction-based actions to be performed based at least in part on the weight condition indication. The one or more prediction-based actions will be described in more detail with reference to FIG. 7.

Optionally, at step/operation 610, the predictive data analysis computing entity 306 may generate a zone status indication data object for the conveyor zone 103b based at least in part on the weight condition indication. For example, the predictive data analysis computing entity 306 may process the weight condition indication as generated by the weight condition detection model to determine if the weight condition detection model classified the conveyor zone 103b as overloaded. If weight condition indication for the conveyor zone 103b indicates conveyor zone 103b is overloaded, the predictive data analysis computing entity 306 may generate a zone status indication data object indicating conveyor zone 103b is overloaded. As another example, if weight condition indication for conveyor zone 103b indicates the conveyor zone 103b is not overloaded, the predictive data analysis computing entity 306 may generate a zone status indication data object indicating conveyor zone 103b is not overloaded.

In some embodiments, the zone status indication data object for the conveyor zone 103b may be output for display. Predictive data analysis computing entity 306 may include or may be in communication with one or more output elements such that the zone status indication data object may be displayed, such as at display 516 of external computing entity 302. The displayed zone status indication data object for the conveyor zone 103b may be viewed by a user such that the user is aware of the real-time or near real-time zone status for the conveyor zone 103b. In some embodiments, a real-time or near real-time zone status indication data object for all conveyor zones including upstream conveyor zone 103a, conveyor zone 103b, and downstream conveyor zone 103c comprising the accumulator conveyor 102 may be displayed. In this way, a user is provided with an up-to-date indication of the status of the accumulator conveyor 102 as a whole.

In some embodiments, the predictive data analysis computing entity 306 may further generate a zone status indication data object for conveyor zone 103b indicating conveyor zone 103b is empty. The predictive data analysis computing entity 306 may be configured to determine the conveyor zone 103b is empty based at least in part on the load condition data object associated with conveyor zone 103b. For example, if the predictive data analysis computing entity 306 determines the load condition data object is indicative of a force within a predefined tolerance of the force determined to be due to the laden weight of the conveyor zone 103b, then predictive data analysis computing entity 306 may determine conveyor zone 103b is empty.

At step/operation 612, the process ends. In some embodiments, once the process ends at step/operation 612, the process may start again at step 602 such that the process may be repeated for the conveyor zone 103b.

Figure 7:
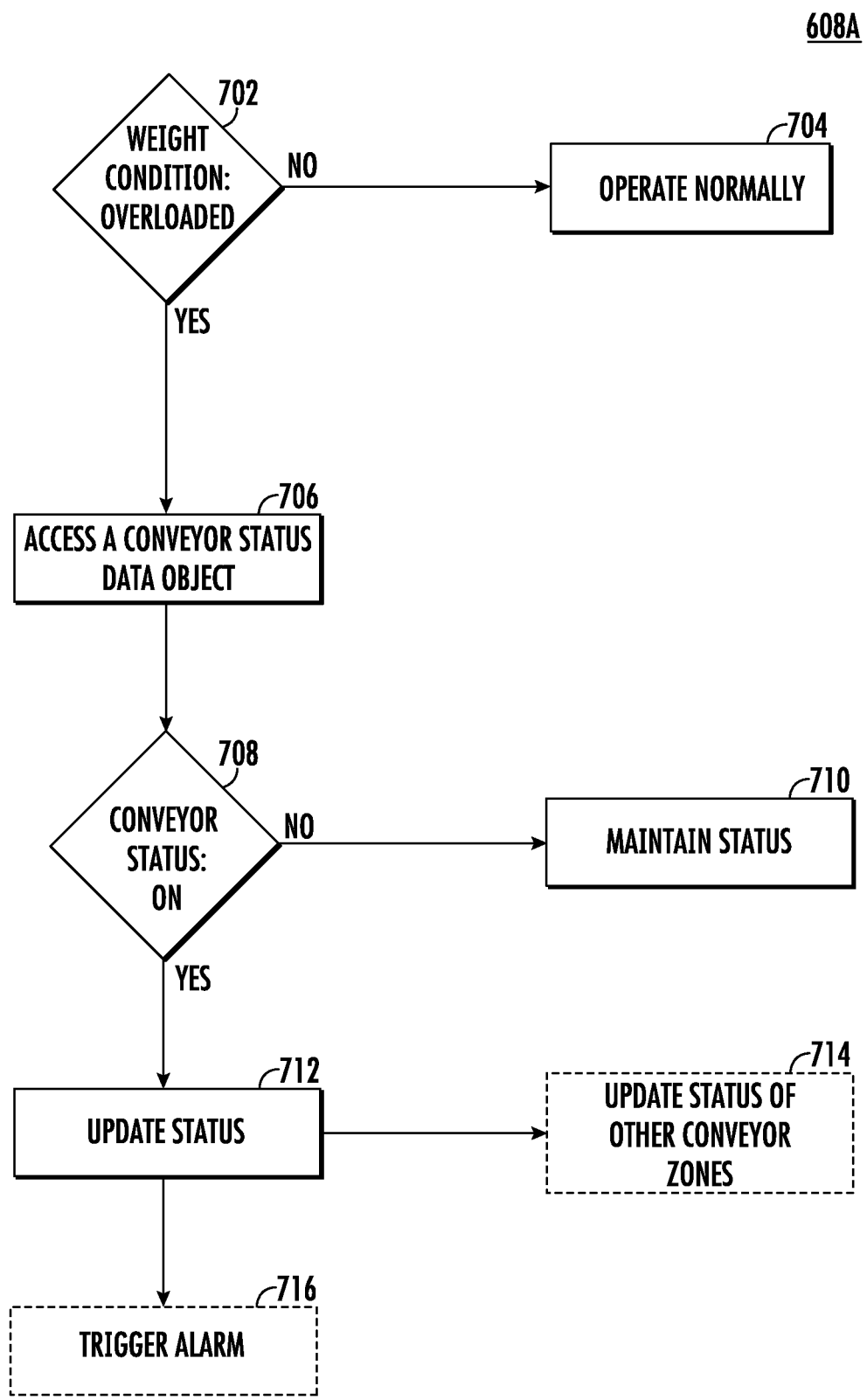
FIG. 7 illustrates control logic for example operations in accordance with various embodiments of the present disclosure.

FIG. 7 illustrates a control logic for example operations 700 for causing one or more prediction-based actions to be performed based on a weight condition indication for a conveyor zone 103b. The control logic is independently executed for each conveyor zone, including upstream conveyor zone 103a, conveyor zone 103b, and downstream conveyor zone 103c by control unit 118 via the zone interface modules 105a, 105b, and 105c.

At step/operation 702, the predictive data analysis computing entity 306 processes the weight condition indication as generated by weight condition detection model for the conveyor zone 103b. If the weight condition indication for the conveyor zone 103b indicates the conveyor zone 103b is not overloaded, the control logic proceeds to step/operation 704. In the instance the conveyor zone 103b is not overloaded, the normal operating status of the conveyor zone is maintained or returned to. If the weight condition indication for the conveyor zone 103b indicates the conveyor zone 103b is overloaded, the control logic proceeds to step/operation 706.

At step/operation 706, the predictive data analysis computing entity 306 accesses a conveyor status data object for the conveyor zone 103b. In some embodiments, the predictive data analysis computing entity 306 accesses the conveyor status data object stored in the memory of an external computing entity 302. For example, conveyor status data object may be stored in a memory associated with warehouse management system 112 or control unit 118. The conveyor status data object may be accessed by the data analysis computing entity 306 in real-time or near real-time such that the conveyor status data object is indicative of the current status of the conveyor zone 103b. For example, the conveyor status data object may indicate the conveyor zone 103b is currently on or may indicate the conveyor zone 103b is currently off. In some embodiments, the conveyor status data object may also comprise identifying information such that conveyor zone 103b may be uniquely identified and differentiated from other conveyor zones. The predictive data analysis computing entity 306 may match the corresponding weight condition indication and conveyor status data object for associated conveyor zone 103b. In some embodiments, this may be accomplished, for example, by mapping the information identifying the conveyor zone 103b between the weight condition indication and the conveyor status data object. In some embodiments, the same identifier may be used such that mapping is not required. In some embodiments, the conveyor status data object may further comprise other conveying information such as the speed, acceleration, or de-acceleration of the conveyor zone 103b.

Once the predictive analysis computing entity 306 accesses a conveyor status data object for the conveyor zone 103b, the control logic proceeds to step/operation 708. At step/operation 708, the predictive data analysis computing entity 306 may determine the current status of conveyor zone 103b based at least in part on the conveyor status data object. For example, predictive data analysis computing entity 306 may process the conveyor status data object to determine whether conveyor zone 103b is currently turned on or off. If predictive data analysis computing entity 306 determines the conveyor status data object indicates the conveyor zone 103b is off, the control logic proceeds to step/operation 710 and determines to maintain the status of the conveyor zone 103b. If predictive data analysis computing entity 306 determines the conveyor status data object indicates the conveyor zone 103b is on, the control logic proceeds to step/operation 712.

In an instance in which the control logic proceeds to step/operation 712, the predictive data analysis computing entity 306 may process the conveyor status data object and the weight condition indication associated with conveyor zone 103b to generate an updated conveyor status data object. In some embodiments, the updated conveyor status data object may cause an update to the status of the conveyor zone 103b, such as causing conveyor zone 103b to shut off. In some embodiments, the updated conveyor status data object may cause the conveyor zone 103b to reduce the speed, reduce the acceleration, or increase the de-acceleration at which the conveyor zone 103b is currently configured to operate. As such, these actions may reduce the speed and/or momentum at which overweight item 106b is traveling or cease movement of the overweight item 106b, and thereby may prevent collision with items on other conveyor zones, such as item 106c within downstream conveyor zone 103c.

The predictive data analysis computing entity 306 may communicate the updated conveyor status data object associated with conveyor zone 103b to the control unit 118 via the communication network 136. The control unit 118 may be configured to execute the updated status as supplied by the conveyor status data object via zone interface module 105b. For example, in an instance in which predictive analysis computing entity 306 generates an updated conveyor status data object indicating a status update to shut off conveyor zone 103b, this updated conveyor status data object may be sent to control unit 118 via communication network 136. The control unit 118 may execute the updated status as supplied by the updated status data object, i.e. shut off conveyor zone 103b, by transmitting instructions to zone interface module 105b such that the zone interface module 105b shuts off conveyor zone 103b. As another example, predictive analysis computing entity 306 may generate an updated conveyor status data object for conveyor zone 103b indicating a status update to reduce the speed of the conveyor zone 103b. The predictive analysis computing entity 306 may similarly transmit the updated conveyor status data object to control unit 118 via communication network 136. The control unit 118 may transmit instructions to zone interface module 105b such that the zone interface module 105b reduces the operating speed of the conveyor zone 103b.

Optionally, the control logic may proceed to step/operation 714. At step/operation 714, the predictive data analysis computing entity 306 may further determine an updated status conveyor data object for of one or more other conveyor zone, such as upstream conveyor zone 103a and/or downstream conveyor zone 103c. Based on the specific updated conveyor status determined for conveyor zone 103b, the predictive data analysis computing entity 306 may generate a updated conveyor status data object for upstream conveyor zone 103a or downstream conveyor zones 103c. For example, if the predictive data analysis computing entity 306 determines to update the status of conveyor zone 103b to shut off, the predictive data analysis computing entity 306 may also determine to shut off one or more upstream conveyor zones 103a. In this way, item 106a from the upstream conveyor zone 103a will not collide with the item 106b currently within conveyor zone 103b. In some embodiments, the status of downstream conveyor zone 103c may remain unchanged and operate normally.

As another example, if predictive data analysis computing entity 306 determines to update the status of conveyor zone 103b to reduce the operating speed, the predictive data analysis computing entity 306 may also determine to reduce the operating speed of upstream conveyor zone 103a and downstream conveyor zone 103c. In this way, the speed of the multiple conveyor zones may be reduced such that conveyor sections of the accumulator conveyor 102, as a whole, may still move cohesively but reduce the likelihood the overweight item 106b will collide with other items on the accumulator conveyor 102.

In an instance in which the control logic proceeds to step/operation 714, the predictive data analysis computing entity 306 may communicate the updated conveyor status data object for one or more other conveyor zones, such as upstream conveyor zone 103a and/or downstream conveyor zone 103c to the control unit 118 via the communication network 136. The control unit 118 may be configured to determine the item flow based on conveyor zone 103b, such that the upstream conveyor zone 103a and downstream conveyor zone 103c in relation to conveyor zone 103b may be determined. The control unit 118 may be configured to execute the status updated as supplied by an updated conveyor status data object for the upstream conveyor zone 103a and/or the downstream conveyor zone 103c via zone interface module 105a and/or 105c, as similarly described above with reference to step operation 712.

Optionally, the control logic may additionally or alternatively proceed from step/operation 712 to step/operation 716. At step/operation 716, the predictive data analysis computing entity 306 may further generate a notification data object indicating an alarm associated with the conveyor zone 103b should be triggered. The predictive data analysis computing entity 306 may send this notification data object to control unit 118 via communication network 136, wherein control unit 118 may then communicate with one or more alarms (not shown) associated with the conveyor zone 103b to cause the one or more alarms to activate. This may quickly alert any nearby employees that the conveyor zone 103b is experiencing overloading. Additionally or alternatively, the predictive data analysis computing entity 306 may generate and transmit an electronic notification to one or more preconfigured computing entities 302. For example, predictive data analysis computing entity 306 may generate and transmit an electronic notification alerting management that conveyor zone 103b is overloaded via email, SMS message, and/or the like.

Figure 8:
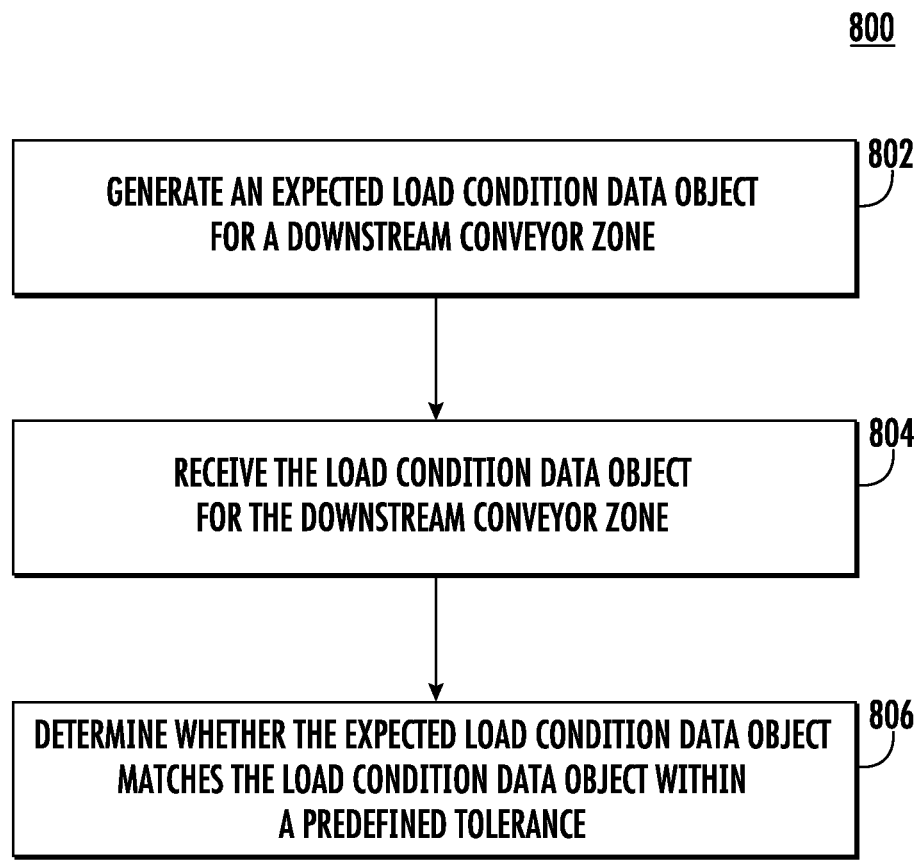
FIG. 8 is a flowchart diagram representing a method of tracking items on a conveyor, in accordance with various embodiments of the present disclosure.

FIG. 8 is a flowchart diagram of an example process 800 for determining if an expected load condition and a received load condition match within a predefined tolerance for a downstream conveyor zone 103c. Via the various steps/operations of the process 800, the predictive data analysis computing entity 306 can generate an expected load condition for the downstream conveyor zone 103c based at least in part on the load condition data object for the conveyor zone 103b. The predictive data analysis computing entity 306 may access the force exerted on the downstream conveyor zone 103c and determine whether the expected load condition matches the accessed load condition data object for the downstream conveyor zone 103c within the predefined tolerance.

At step/operation 802, the predictive data analysis computing entity 306 may generate an expected load condition data object for downstream conveyor zone 103c. This expected load condition data object may be generated based at least in part on the load condition data object for the conveyor zone 103b. The expected load condition data object may be configured to describe a force expected to be exerted on the at least one downstream conveyor zone. For example, if conveyor zone 103b with item 106b currently has an associated load condition data object indicating an exerted force with value X, then the predictive data analysis computing entity 306 may generate an expected load condition data object for downstream conveyor zone 103c indicating an expected force with value X.

At step/operation 804, the predictive data analysis computing entity 306 may access a load condition data object configured to describe the force exerted on the at least one downstream conveyor. For example, as item 106*b* is transferred from conveyor zone 103*b* to downstream conveyor zone 103*c*, the predictive data analysis computing entity 306 may access the associated load condition data object for the downstream conveyor zone 103*c* containing the item 106*b*. This step/operation may be substantially similar to step/operation 604. The accessed load condition data object may describe the force exerted on the downstream conveyor zone 103*c* by item 106*b*.

At step/operation 806, the predictive data analysis computing entity 306 may determine whether the load condition data object matches the expected load condition data object within a predefined tolerance. The predefined tolerance may be a configurable parameter such that any tolerance values may be contemplated. For example, the predictive data analysis computing entity 306 may compare the load condition data object indicative of a force value Y exerted on downstream conveyor zone 103*c* from item 106*b* to the expected load condition data object as generated by the predictive data analysis computing entity 306 based at least in part on the load condition data object indicative of a force value X exerted on conveyor zone 103*b* from item 106*b*. The predictive data analysis computing entity 306 may compare value Y from the load condition data object to determine if the value Y is within a predefined tolerance, such as 5%, of the value X from the expected load condition data object. As such, this provides for tracking of item 106*b* as it travels between conveyor zones along the accumulator conveyor 102.

In some embodiments, if the load condition data object is within the predefined tolerance of the expected load condition data object, then the operation continues as normal. In an instance when the load condition data object is not within the predefined tolerance of the expected load condition data object, the predictive data analysis computing entity 306 may generate and transmit an electronic notification to one or more preconfigured computing entities 302 indicating a discrepancy between the load condition data object and the expected load condition data object. For example, data analysis computing entity may generate and transmit an electronic notification indicating downstream conveyor zone 103*c* has a discrepancy between the load condition data object and the expected load condition data object. Such a discrepancy may occur when item 106*b* is stuck on conveyor zone 103*b*, collides with another item and/or object such that it unexpectedly passes downstream conveyor zone 103*c*, is removed unexpectedly from the accumulator conveyor 102, or the like.

Using the methods and systems described above, dynamic detection of items on a conveyor zone can be performed quickly and accurately in a variety of applications.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method for dynamically detecting an item within a conveyor zone, the computer-implemented method comprising:
   accessing a load condition data object, wherein the load condition data object is indicative of a force exerted on at least one conveyor zone;
   processing, using one or more processors, the load condition data object using a weight condition detection model to generate a weight condition indication associated with the at least one conveyor zone; and
   causing, using the one or more processors, one or more prediction-based actions to be performed on the at least one conveyor zone based at least in part on the weight condition indication, wherein the one or more prediction-based actions are associated with controlling operations of the conveyor zone.

2. The computer-implemented method of claim 1, further comprising:
   accessing a conveyor status data object configured to describe current status of the at least one conveyor zone, and
   wherein causing the one or more prediction-based actions comprises:
     processing, using the one or more processors, at least the weight condition indication and the conveyor status data object to generate an updated conveyor status data object for the at least one conveyor zone;
     transmitting the updated conveyor status data object for the at least one conveyor zone to a conveyor control unit, wherein the updated conveyor status data object is configured to cause the conveyor control unit to update status of the at least one conveyor zone.

3. The computer-implemented method of claim 1, wherein causing, using the one or more processors, the one or more prediction-based actions to be performed comprises maintaining current conditions in an instance in which the weight condition indication indicates the at least one conveyor zone is not overloaded.

4. The computer-implemented method of claim 1, wherein causing the one or more prediction-based actions comprises:
   processing, using the one or more processors, the weight condition indication for the at least one conveyor zone to determine a conveyor status data object for one or more other conveyor zones; and
   transmitting the conveyor status data object for the one or more other conveyor zones to a conveyor control unit, wherein the conveyor status data object is configured to cause the conveyor control unit to update status of the one or more other conveyor zones.

5. The computer-implemented method of claim 4, wherein the conveyor control unit is configured to determine at least an upstream or downstream conveyor zone for the at least one conveyor zone.

6. The computer-implemented method of claim 1, further comprising generating, using the one or more processors, a zone status indication data object associated with the at least one conveyor zone, based at least in part on the weight condition indication.

7. The computer-implemented method of claim 1, further comprising:
generating, using the one or more processors, a notification data object for the at least one conveyor zone; and
transmitting the notification data object for the at least one conveyor zone to a conveyor control unit, wherein the notification data object is configured to trigger at least an alarm associated with the at least one conveyor zone, based at least in part on the weight condition indication.

8. The computer-implemented method of claim 1, further comprising:
generating, using the one or more processors, an expected load condition data object for at least one downstream conveyor zone based at least in part on the load condition data object for the at least one conveyor zone, wherein the expected load condition data object is configured to describe the force expected to be exerted on the at least one downstream conveyor zone;
accessing a load condition data object configured to describe the force exerted on the at least one downstream conveyor zone; and
determining, using the one or more processors, whether the expected load condition data object matches the load condition data object within a predefined tolerance for the at least one downstream conveyor zone.

9. An apparatus for dynamically detecting an object on a conveyor zone, the apparatus comprising:
one or more sensor elements configured to electronically transmit a load condition data object, wherein the load condition data object is indicative of a force exerted on at least one conveyor zone;
at least one processing component configured to:
access the load condition data object;
process, using one or more processors, the load condition data object using a weight condition detection model to generate a weight condition indication associated with the at least one conveyor zone; and
cause, using the one or more processors, one or more prediction-based actions to be performed on the at least one conveyor zone based at least in part on the weight condition indication, wherein the one or more prediction-based actions are associated with controlling operations of the conveyor zone.

10. The apparatus of claim 9, the apparatus further comprising:
a conveyor control unit configured to control conveyor status of the at least one conveyor zone,
wherein causing the one or more prediction-based actions to be performed comprises using the at least one processing component to:
access a conveyor status data object configured to describe current status of the at least one conveyor zone;
process at least the weight condition indication and the conveyor status data object to generate an updated conveyor status data object for the at least one conveyor zone; and
transmit the updated conveyor status data object for the at least one conveyor zone to the conveyor control unit, wherein the updated conveyor status data object is configured to cause the conveyor control unit to update status of the at least one conveyor zone.

11. The apparatus of claim 9, wherein causing the one or more prediction-based actions to be performed comprises using the at least one processing component to maintain current conditions in an instance in which the weight condition indication indicates the at least one conveyor zone is not overloaded.

12. The apparatus of claim 9, the apparatus further comprising:
a conveyor control unit configured to control conveyor status of at least one or more other conveyor zones,
wherein causing the one or more prediction-based actions to be performed comprises using the at least one processing component to:
process the weight condition indication and the one or more prediction-based actions of the at least one conveyor zone to determine a conveyor status data object for one or more other conveyor zones; and
transmit the conveyor status data object for the one or more other conveyor zones to the conveyor control unit, wherein the conveyor status data object is configured to cause the conveyor control unit to update status of the one or more other conveyor zones.

13. The apparatus of claim 12, wherein the conveyor control unit is configured to determine at least an upstream or downstream conveyor zone for the at least one conveyor zone.

14. The apparatus of claim 9, wherein the at least one processing component is further configured to generate a zone status indication associated with the at least one conveyor zone based at least in part on the weight condition indication.

15. The apparatus of claim 9, the apparatus further comprising:
a conveyor control unit configured to control an alarm associated with at least one conveyor status of the at least one conveyor zone,
wherein the at least one processing component is further configured to:
generate a notification data object for the at least one conveyor zone; and
transmit the notification data object for the at least one conveyor zone to the conveyor control unit, wherein the notification data object is configured to trigger at least the alarm associated with the at least one conveyor zone based at least in part on the weight condition indication.

16. The apparatus of claim 9, wherein the at least one processing component is further configured to:
generate an expected load condition data object for at least one downstream conveyor zone based at least in part on the load condition data object for the at least one conveyor zone, wherein the expected load condition data object is configured to describe the force expected to be exerted on the at least one downstream conveyor zone;
access a load condition data object configured to describe the force exerted on the at least one downstream conveyor zone; and
determine whether the expected load condition data object matches the load condition data object within a predefined tolerance for the at least one downstream conveyor zone.

17. A computer program product configured to dynamically detect an object on a conveyor zone, the computer program product comprising at least one non-transitory computer-readable storage medium having computer-readable program code portions stored therein, the computer-readable program code portions configured, upon execution, to:
- access a load condition data object, wherein the load condition data object is indicative of a force exerted on at least one conveyor zone;
- process, using one or more processors, the load condition data object using a weight condition detection model to generate a weight condition indication associated with the at least one conveyor zone; and
- cause, using the one or more processors, one or more prediction-based actions to be performed on the at least one conveyor zone based at least in part on the weight condition indication, wherein the one or more prediction-based actions are associated with controlling operations of the conveyor zone.

18. The computer program product of claim 17, wherein causing the one or more prediction-based actions to be performed comprises the computer-readable program code portions further configured, upon execution, to:
- access a conveyor status data object configured to describe current status of the at least one conveyor zone;
- process at least the weight condition indication and the conveyor status data object to generate an updated conveyor status data object for the at least one conveyor zone; and
- transmit the updated conveyor status data object for the at least one conveyor zone to a conveyor control unit, wherein the updated conveyor status data object is configured to cause the conveyor control unit to update status of the at least one conveyor zone.

19. The computer program product of claim 17, wherein causing the one or more prediction-based actions to be performed comprises the computer-readable program code portions further configured, upon execution, to:
- process the weight condition indication and the one or more prediction-based actions of the at least one conveyor zone to determine a conveyor status data object for one or more other conveyor zones; and
- transmit the conveyor status data object for the one or more other conveyor zones to a conveyor control unit, wherein the conveyor status data object is configured to cause the conveyor control unit to update status of the one or more other conveyor zones.

20. The computer program product of claim 17, wherein the computer-readable program code portions are further configured, upon execution, to:
- generate an expected load condition data object for at least one downstream conveyor zone based at least in part on the load condition data object for the at least one conveyor zone, wherein the expected load condition data object is configured to describe the force expected to be exerted on the at least one downstream conveyor zone;
- access a load condition data object configured to describe the force exerted on the at least one downstream conveyor zone; and
- determine whether the expected load condition data object matches the load condition data object within a predefined tolerance for the at least one downstream conveyor zone.

* * * * *